April 3, 1962
R. H. PARSONS
3,027,675
FISHING SIGNAL
Filed Sept. 24, 1958
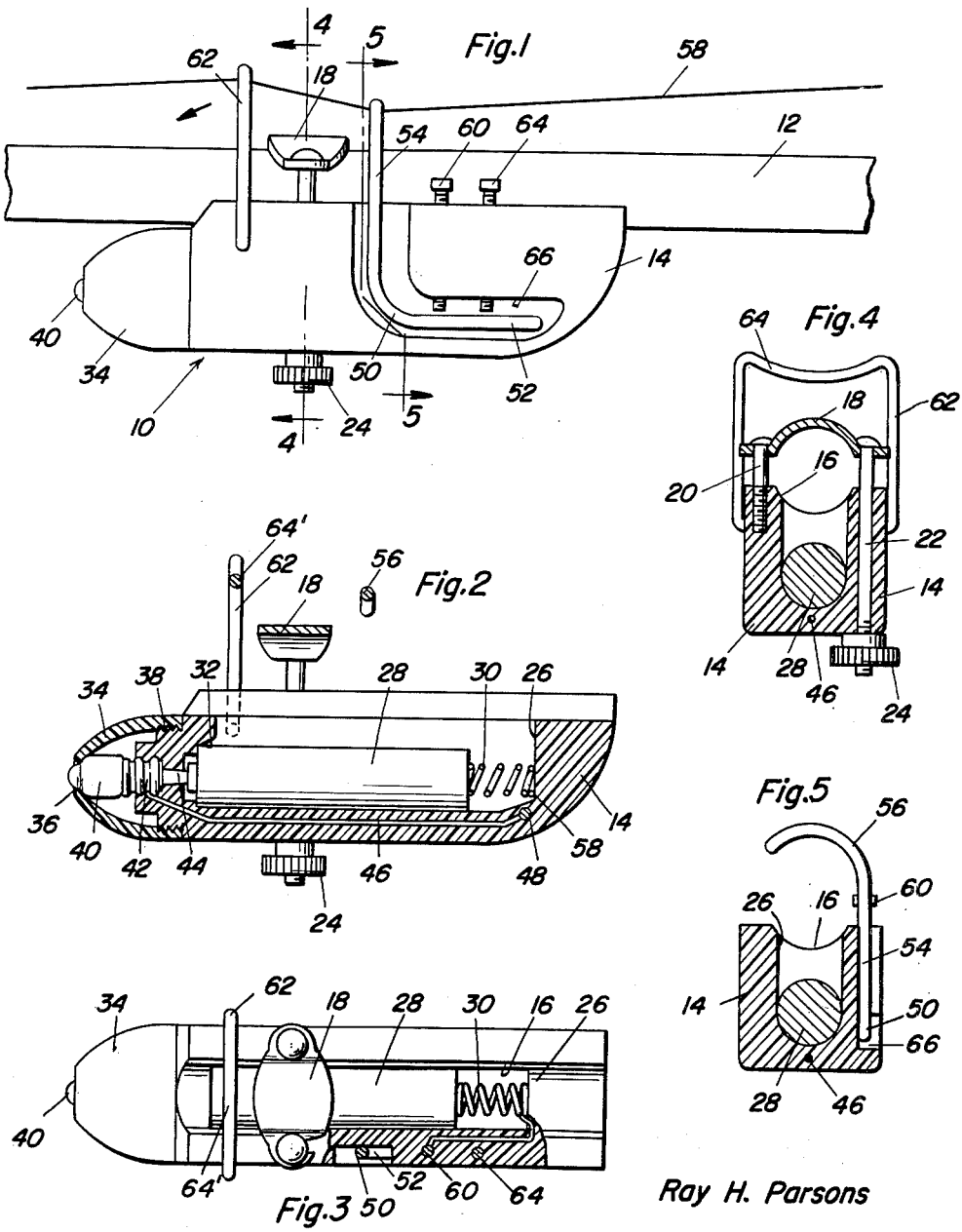
Ray H. Parsons
INVENTOR.
BY *Clarence A.O'Brien*
*and Harvey B. Jacobson*
Attorneys

United States Patent Office 3,027,675
Patented Apr. 3, 1962

3,027,675
FISHING SIGNAL
Ray H. Parsons, 103 E. Walnut St., Tipp City, Ohio, assignor of ten percent to Alva M. Parsons, Tipp City, Ohio
Filed Sept. 24, 1958, Ser. No. 763,121
4 Claims. (Cl. 43—17)

The present invention relates to an improved signalling device and more particularly to a fishing signal especially adapted for use by night fishermen whereby the signal includes a light which will be illuminated to indicate that a fish has taken the hook.

When a fish bites, tension is normally placed on the fishing line. In daytime, movement of the line and the impulse given to the pole by the fish is sufficient to indicate to the fisherman that a fish is taking the bait. However, at night, it is more difficult to determine whether a fish is biting or not. Therefore, it is the primary object of the present invention to provide a fishing signal which will indicate to the night fisherman when a fish bites by employing the increased tension on the fishing line caused by the biting fish to operate a light signal and indicating or signalling that a fish is biting.

A further object of the present invention is to provide a fishing signal including an operating member engaged with the fishing line so that the operating member will move in response to an increase in tension on the fishing line for closing a circuit and illuminating a signal light.

A further object of the present invention is to provide a fishing signal in accordance with the preceding objects in which the line tension necessary for illuminating the signal light may be adjustably varied whereby predetermined line tension may be adjusted in accordance with the conditions being encountered so that the pull on the line necessary to operate or illuminate the signal light may be varied.

Yet another feature of the present invention is to provide a fishing signal which is simple in construction, easy to attach, attached in an out-of-the-way position in relation to the reel for permitting normal operation of the reel, compact, foolproof in operation and relatively inexpensive to manufacture.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a side elevation of the fishing signal of the present invention attached to a rod and associated with the fishing line for operation of the signal;

FIGURE 2 is a longitudinal, vertical sectional view taken substantially upon a plane passing along a longitudinal center of the signal;

FIGURE 3 is a plan view of the fishing signal with portions broken away showing further structural details thereof;

FIGURE 4 is a transverse, sectional view taken substantially upon a plane passing along section line 4—4 of FIGURE 1 illustrating the details of construction of the clamp member and the rest or support for the fishing rod; and FIGURE 5 is a transverse, sectional view taken substantially upon a plane passing along section line 5—5 of FIGURE 1 illustrating the details of construction of the movable hook on the movable contact for engagement with the fish line for movement in response to variation in the tension on the fish line.

Referring now specifically to the drawings, the numeral 10 generally designates the fishing signal of the present invention which is attached to a fishing rod 12 of any conventional construction with the signal 10 being mounted outwardly of the reel normally provided on the rod 12 with the signal 10 being mounted on the opposite side of the rod 12 from the reel. In other words, the reef (not shown) will normally be disposed on the upper surface of the rod whereas the signal 10 will be mounted substantially below the rod 12 so that the rod and reel may be operated in the usual manner during the daytime without using the fishing signal 10 and without being interfered with by the fishing signal 10.

The fishing signal 10 includes a generally hollow elongated body 14 which may be constructed of plastic or the like having a generally semi-cylindrical or concave upper surface 16 for fitting and receiving the fishing rod 12. A clamp 18 is provided in opposition to the recess 16 and is provided with a complementary concave surface with the clamp 18 being held in position by screw threaded fasteners 20 and 22. The screw threaded fastener 22 extends completely through the body 14 and extends therebelow and is provided with a knurled thumb nut 24 at the lower end thereof which is engaged at the bottom of the body 14 and is effective for clamping the body 14 to the rod 12 with the rod 12 received in the groove 16.

Disposed in the hollow interior 26 of the body 14 is a flashlight battery 28 having a compression coil spring 30 extending between the end of the flashlight battery 28 and the end wall of the hollow interior 26. The other end of the hollow interior 26 is provided with a socket 32 receiving the battery and a removable cover or cap 34 having an aperture 36 therein is attached to the front of the body 14 by a screw threaded attachment 38. A bulb 40 is disposed within the cover 34 and is screw threaded into a socket 42 which has electrical contact by virtue of a contact member 44 with the central terminal of the battery 28. The socket 42 is connected with an electrical conductor 46 which extends rearwardly to a transverse pin or shaft 48 which extends through the body 14 and which is integral with one end of a generally L-shaped, resilient contact trigger designated by the numeral 50 and including a horizontal leg 52 forming an extension of the transverse shaft 48 and a vertical leg 54 which terminates in a downwardly curved or downwardly facing curved portion 56 for receiving the fishing line 58 thereunder. Thus, the conductor 46 is in electrical contact with the contact trigger 50. Extending from the end of the spring 30 is an electrical conductor 58 in contact with an adjustably mounted contact or circuit make and break screw 60 which extends through the body 14 and engages the top of the arm 52, of the contact trigger 50 when the same is raised thus completing a circuit from the battery 28 through the spring 30, conductor 58 to the adjustable screw threaded contact member or screw 60, through the trigger 50 (when the same is elevated) and through the transverse rocker shaft 48 back through the conductor 46 up to the socket 42 which is in electrical contact with the other end of the battery 28 thus completing the circuit for illuminating the light bulb 40.

Mounted forwardly on the body 10 is an inverted U-shaped wire member or bracket 62 which has a downwardly curved bight portion 64' over which the fish line 58 pays out when the same passes under the downwardly facing hook shaped element 56. Immediately behind the adjustment contact screw 60 is a second adjustment screw 64 (a single setscrew) which may be set to vary the tension required on the fish line 58 before the contact trigger 54 is actuated to bring the same into contact with screw 60. The contact trigger 50 is mounted in an L-shaped groove 66 provided therefor in the side of the body 14 and will normally be constructed of a spring metal or the like for allowing the tension on the line 58 to be varied before the contact trigger 54 engages the circuit closing contact screw 60.

The device may be made with the head removable for replacing the battery 28 although the same may be replaced from the inner surface thereof.

If the user desires to employ the invention as an ordinary flashlight this is permissible because by simply turning the circuit make and break or contact screw 60 down and engaging the lower end thereof with the arm 52 the circuit is manually closed and the bulb is flashed on. It will be also noticed that by turning the setscrew 64 to exert a downward pressure on the arm 52 for tilting the trigger within the confines of the L-shaped slot or groove 66 the overhanging hook or finger 56 is moved closer to the rod and is therefore in an out-of-the-way position when said rod is not in use. The very reason in placing the device itself underneath of the rod and out of the way of the reel and line is to permit the device to always be on hand but at the same time to be neither conspicuous nor in the way when resorting to daytime fishing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. For use on a fishing rod with a fishing line operable thereon, a fishing signal comprising a horizontally elongated body mounted longitudinally beneath the rod, said body including a top portion having a longitudinal groove of arcuate transverse section therein providing a seat receiving the rod, said body further having a chamber therein extending downwardly thereinto from said top portion thereof in communication with the groove and closed by the rod therein, a battery mounted in the chamber, an incandescent lamp mounted on one end of the body, means for removably securing the body on the rod, and means comprising a switch, operable to closed position by the line, for energizing said lamp from the battery, one side of said lamp being electrically connected to the positive side of the battery, said body still further including a side portion having a generally L-shaped groove therein extending to the top thereof, said switch including a resilient, angular metallic arm operable in the second named groove and having one end secured therein and electrically connected to the other side of the lamp, a transversely extending hook on the free end of the arm traversing the rod and slidably receiving the line therebeneath for actuation thereby to circuit closing position, and an adjustable contact screw, electrically connected to the negative side of the battery, threadedly mounted in said side portion of the body and projecting into the second named groove for engagement by the arm.

2. For use on a fishing rod with a fishing line operable thereon, a fishing signal comprising a horizontally elongated body mounted longitudinally beneath the rod, said body including a top portion having a longitudinal groove of arcuate transverse section therein providing a seat receiving the rod, said body further having a chamber therein extending downwardly thereinto from said top portion thereof in communication with the groove and closed by the rod therein, a battery mounted in the chamber, an incandescent lamp mounted on one end of the body, means for removably securing the body on the rod, and means comprising a switch, operable to closed position by the line for energizing said lamp from the battery, said securing means including an upstanding screw on one side portion of the body, a clamping bar loosely mounted at one end on said upstanding screw and engageable transversely with the rod, a bolt mounted on the other end portion of said bar and extending slidably through the other side portion of the body, and a nut threaded on the bolt and engaged beneath the body for clamping the bar on the rod, one side of said lamp being electrically connected to the positive side of the battery, said body still further including a side portion having a generally L-shaped groove therein extending to the top thereof, said switch including a resilient, angular metallic arm operable in the second named groove and having one end secured therein and electrically connected to the other side of the lamp, a transversely extending hook on the free end of the arm traversing the rod and slidably receiving the line therebeneath for actuation thereby to circuit closing position, and an adjustable contact screw, electrically connected to the negative side of the battery, threadedly mounted in said side portion of the body and projecting into the second named groove for engagement by the arm.

3. For use on a fishing rod with a fishing line operable thereon, a fishing signal comprising a body secured beneath the rod, a battery mounted in the body, an incandescent lamp mounted on the body and having one side electrically connected to the positive side of the battery, an inverted U-shaped guide mounted on the body astraddle the rod and adapted to slidably support the line, said body having a generally L-shaped groove in one side, a resilient, angular arm pivotally mounted on said one side of the body and operable in the groove and electrically connected to the other side of the lamp, a lateral hook on the free end of the arm traversing the rod and resting on the line for actuation thereby, a contact screw threadedly mounted for adjustment in the body and electrically connected to the negative side of the battery, said contact screw projecting into the groove for engagement by the arm for energizing the lamp, a screw threadedly mounted for adjustment in the body and engageable with the arm for regulating the travel thereof toward circuit-closing position, and means for securing the body on the rod.

4. A fishing signal in accordance with claim 3, wherein said body is elongated and has a longitudinal groove in its top portion seatingly receiving the rod, and wherein said securing means includes a plate mounted transversely on the rod, and clamping bolts on opposite sides of the rod securing said plate to the body.

References Cited in the file of this patent

UNITED STATES PATENTS

| | | |
|---|---|---|
| 522,352 | Poppowitsch | July 3, 1894 |
| 1,315,986 | Radcliffe | Sept. 16, 1919 |
| 2,233,311 | Harne | Feb. 25, 1941 |
| 2,634,538 | Sader et al. | Apr. 14, 1953 |
| 2,643,371 | Sleeger | June 23, 1953 |